(12) United States Patent
Kovacs

(10) Patent No.: US 7,232,951 B1
(45) Date of Patent: Jun. 19, 2007

(54) REINFORCED JUNCTION BOX

(75) Inventor: Janos Kovacs, Union, NJ (US)

(73) Assignee: Mulberry Metal Products, Inc., Union, NJ (US)

( * ) Notice: Subject to any disclaimer, the term of this patent is extended or adjusted under 35 U.S.C. 154(b) by 0 days.

(21) Appl. No.: 11/299,532

(22) Filed: Dec. 12, 2005

(51) Int. Cl.
*H01H 9/02* (2006.01)

(52) U.S. Cl. .................. 174/58; 174/50; 174/53; 220/4.02

(58) Field of Classification Search ............ 174/53, 174/58, 48, 50, 17 R; 220/3.2, 3.8, 4.02, 220/3.92
See application file for complete search history.

(56) References Cited

U.S. PATENT DOCUMENTS

| | | | |
|---|---|---|---|
| 2,991,327 A | 7/1961 | Bellek | |
| 3,187,084 A | * 6/1965 | Stillman et al. | ........... 174/58 |
| 3,215,769 A | 11/1965 | Slater | |
| 3,288,910 A | * 11/1966 | Zerwes | ........... 174/53 |
| 3,908,074 A | 9/1975 | Berg | |
| 4,019,647 A | 4/1977 | Arnold | |
| 4,753,361 A | 6/1988 | Medlin, Jr. | |
| 5,038,000 A | 8/1991 | Westbrook et al. | |
| 5,408,045 A | 4/1995 | Jorgensen et al. | |
| 6,164,475 A | 12/2000 | Jorgensen | |
| 6,563,050 B2 | 5/2003 | Gustine et al. | |
| 2003/0079894 A1 | 5/2003 | Weise et al. | |

OTHER PUBLICATIONS

Sections 12.3.1-12.3.3 of the Underwriters Laboratories (UL) Standards, NMX-J-023/1-ANCE, CSA C22.2 No. 18.1-04, UL 514A, pp. 44, 67 Table 8, and 75 Figure 12 (Feb. 16, 2004).
Photograph of a Junction Box (Commercialized Circa Oct. 1972).
Mulberry Metal Products, Inc. Catalog No. B0803 (Aug. 2003).

* cited by examiner

*Primary Examiner*—Dhiru R. Patel
(74) *Attorney, Agent, or Firm*—McCarter & English, LLP (57) ABSTRACT

Disclosed herein is a junction box having a housing and a plurality of straps. The housing includes a plurality of ribs with posts extending therefrom. Each one of the straps has a plurality of receiving areas defined by a contiguous radial surface, such as a countersink surface. The posts extend through the receiving areas and securingly retain the straps against the housing. In an exemplary embodiment of the present invention, the posts are substantially frustoconical prior to assembly and may be characterized as deformed frustrums after assembly.

15 Claims, 8 Drawing Sheets

REINFORCED JUNCTION BOX

FIELD OF THE INVENTION

The present invention relates generally to a junction box for containing electrical components and, more particularly, to a junction box that includes a housing and a plurality of mounting straps.

BACKGROUND OF THE INVENTION

Junction boxes for containing electrical connections are known in the prior art, and typically includes a housing with one or more plates securable thereto. Reference is made, for example, to U.S. Pat. No. 3,215,769 (the "Slater '769 patent") for a cast weatherproof electrical outlet box with staked end plates for mounting electrical wiring devices. The Slater '769 patent discloses end plates that are installed onto a casting. The plates are permanently held in position by stakes formed in the end plates and complementary recesses formed in the casting.

Figure 1:
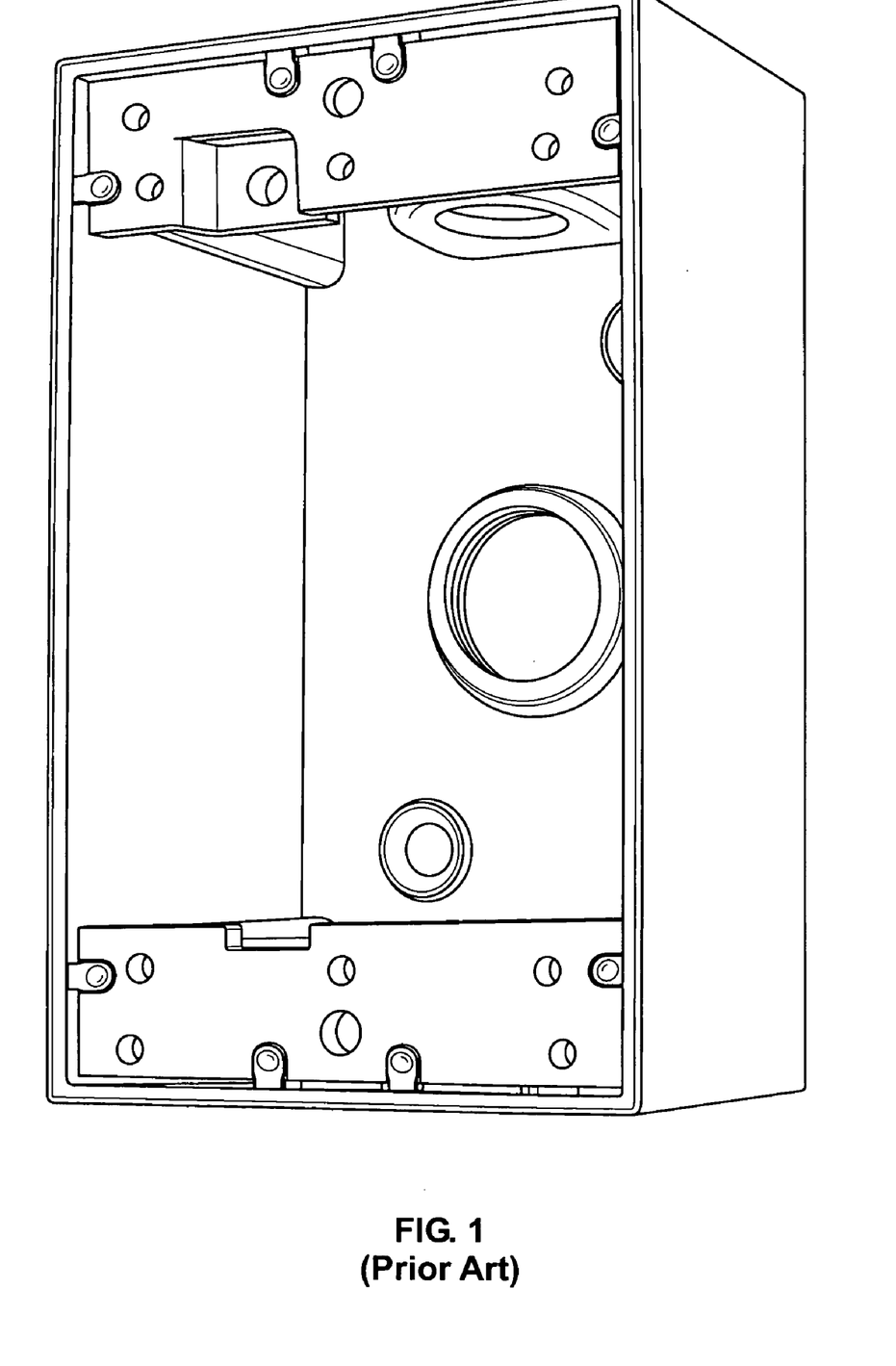
FIG. 1 is a perspective view of a first prior art junction box.
Figure 2:
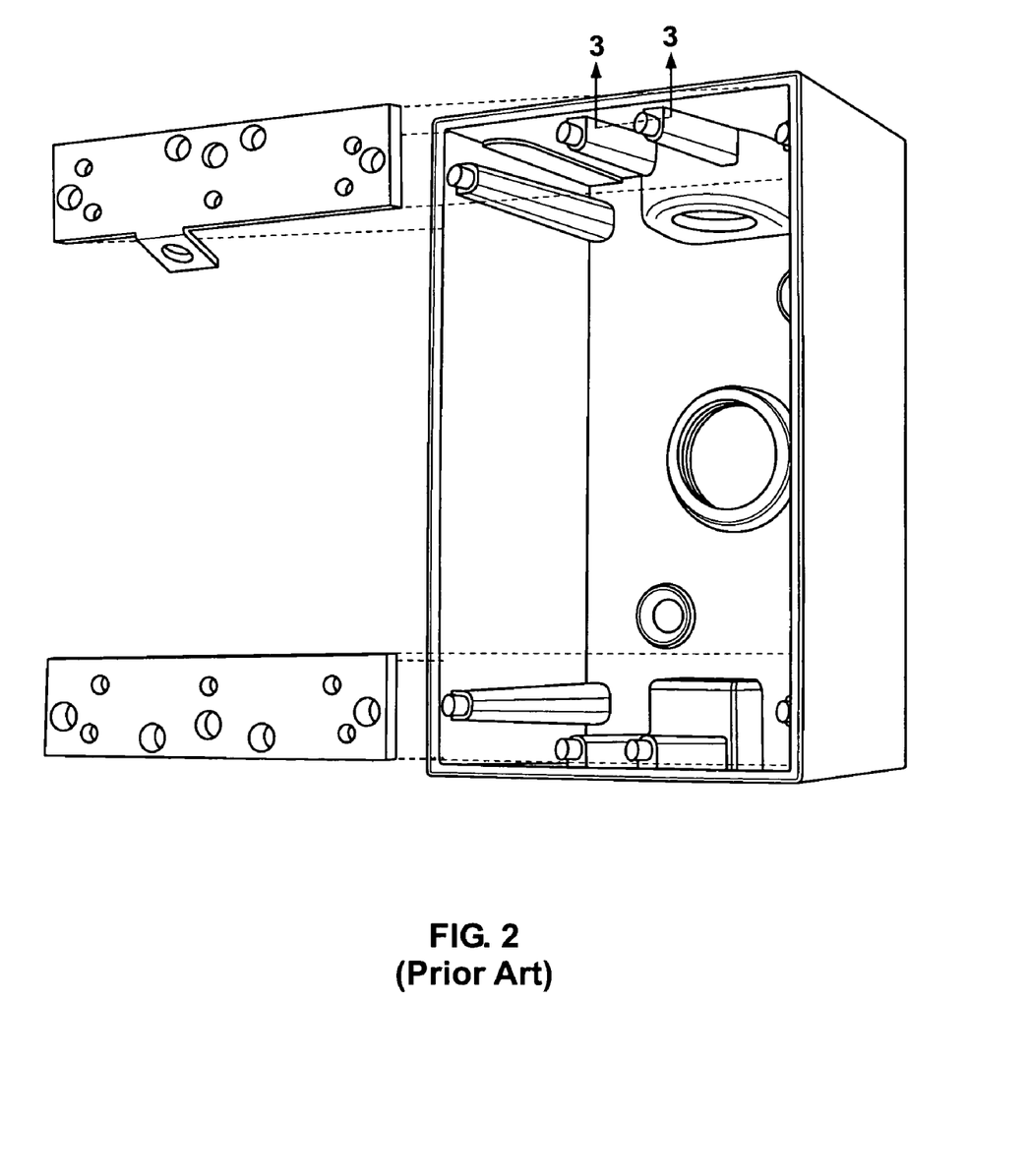
FIG. 2 is a perspective view of a second prior art junction box.
Figure 3:
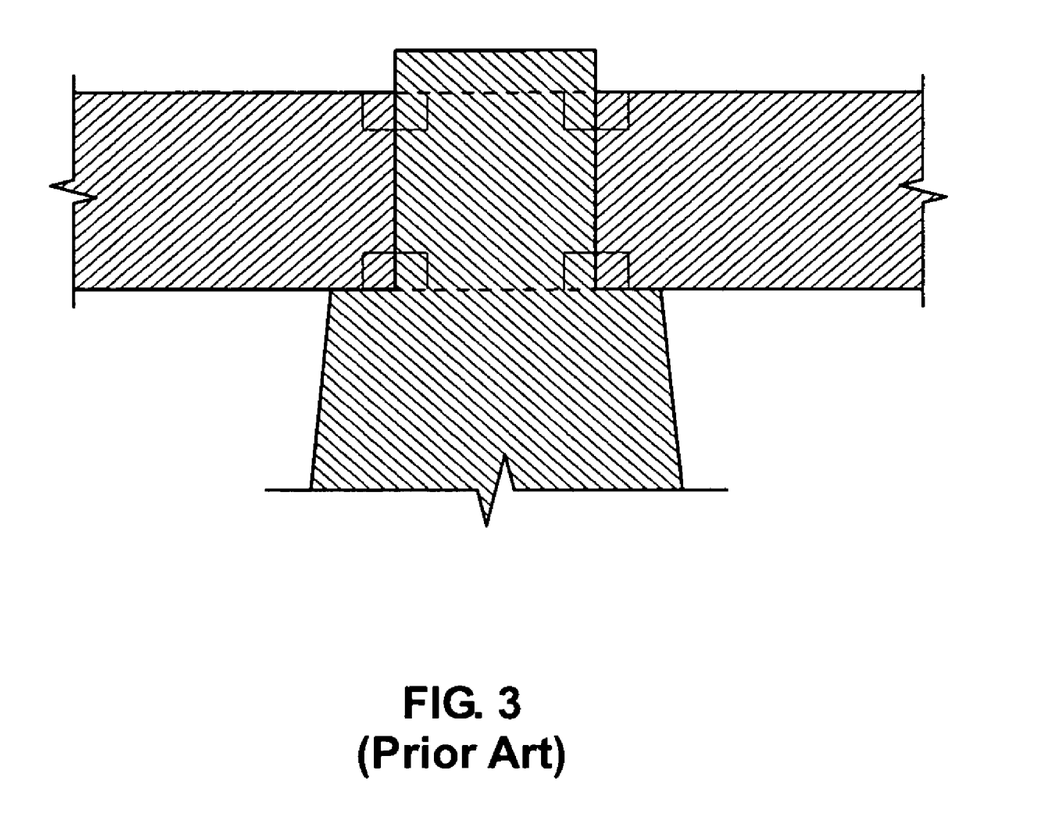
FIG. 3 is a broken cross-sectional view taken along section line 3—3 of FIG. 2.

The prior art also includes junction boxes such as the prior art junction box shown in FIG. 1, which includes a housing and two mounting straps secured thereto. The housing includes tab-like lugs integrally formed with the walls of the housing, and the mounting straps have open channels along the edges thereof for securingly receiving the lugs. Further illustrative of the prior art, FIGS. 2 and 3 show another prior art junction box that also includes a housing and two mounting straps secured thereto. The housing of the prior art junction box of FIGS. 2 and 3 includes posts that are each formed as a right cylinder. The mounting straps of the prior art junction box of FIGS. 2 and 3 have conventional bores formed therethrough for receiving the right cylinders.

Junction boxes are often the subject of evaluation by organizations that promulgate standards in connection therewith. These standards propose that a junction box should have a minimum resistance to the environmental forces that are typically applied to the junction box. However, the magnitude of the environmental forces applied to a junction box has increased over time, and what is needed in the art is a reinforced junction box that is resistant to increased environmental forces.

SUMMARY OF THE INVENTION

The present invention overcomes the disadvantages and shortcomings of the prior art discussed above by providing for a junction box that has specially-formed posts and/or receiving areas for securing said posts.

An unassembled junction box constructed in accordance with an exemplary embodiment of the present invention includes a housing that is securable to a plurality of mounting straps that each has countersink surfaces formed therein to define receiving areas. The unassembled junction box further includes a housing having a plurality of posts that are substantially frustoconical. Each one of the posts are sized, dimensioned, and aligned so as to be insertable through a corresponding receiving area.

Methods of manufacturing a junction box are also disclosed herein. An exemplary method of the present invention includes a step for providing a plurality of mounting straps having countersink surfaces that define receiving areas and a step for providing a housing that has a plurality of posts in frustoconical form. The exemplary method also includes a step for inserting the posts through the receiving areas and a step for deforming the posts such that the posts securingly retain the mounting straps against the housing.

An assembled junction box constructed in accordance with an exemplary embodiment of the present invention includes a housing having posts secured to a plurality of mounting straps having receiving areas. Each one of the posts of the housing extends through a corresponding one of the receiving areas. In the assembled form of the junction box, the posts may be characterized as deformed frustums, and the deformed frustums securingly retain the mounting straps against the housing.

BRIEF DESCRIPTION OF THE DRAWINGS

For a more complete understanding of the present invention, reference is made to the following detailed description of the exemplary embodiment considered in conjunction with the accompanying drawings, in which.

DETAILED DESCRIPTION OF THE INVENTION

Figure 4:
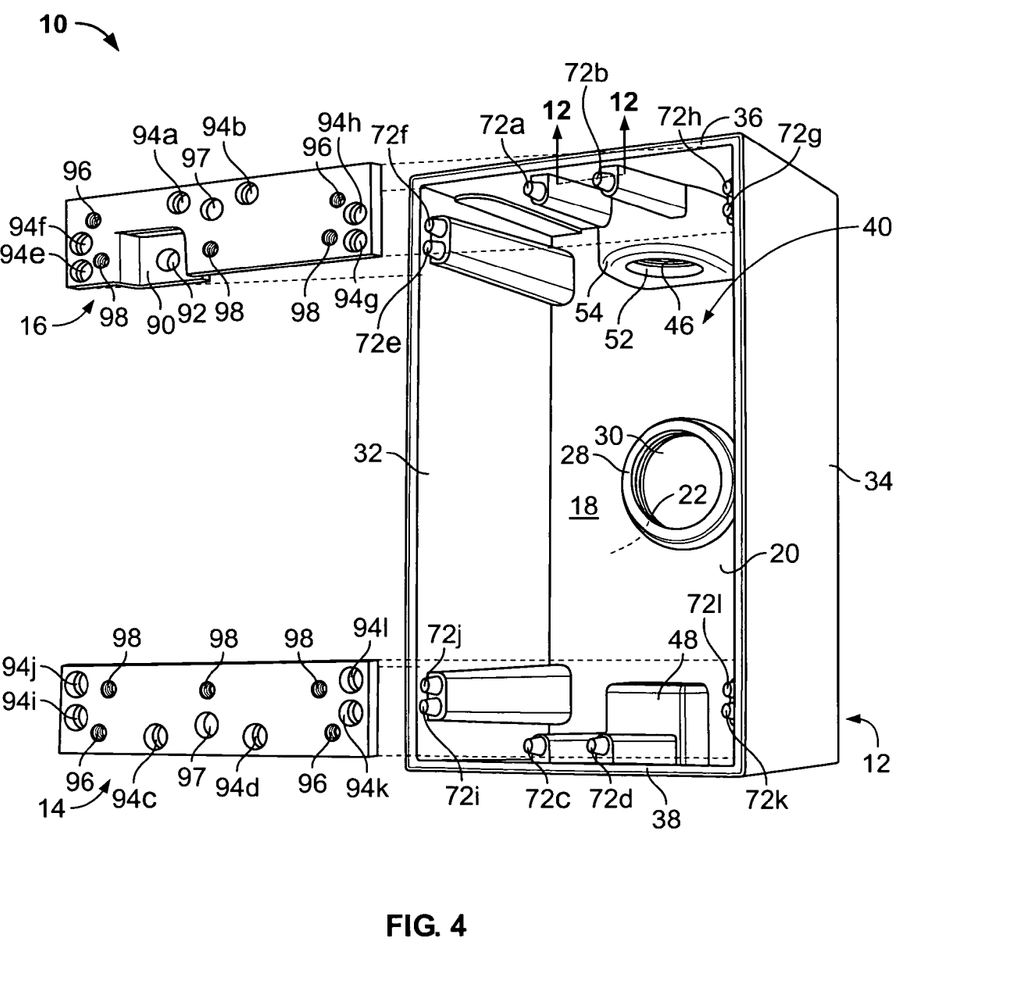
FIG. 4 is an exploded perspective view of an unassembled junction box constructed in accordance with an exemplary embodiment of the present invention, said junction box being shown to include a housing, a first mounting strap, and a second mounting strap.
Figure 5:
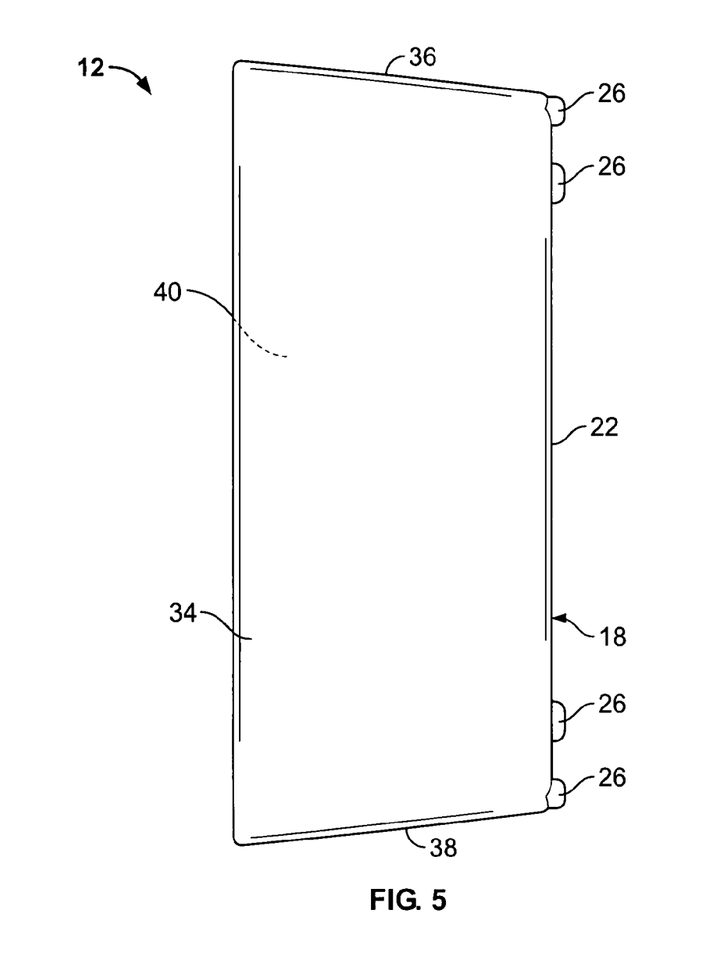
FIG. 5 is a right side view of the housing of FIG. 4, the left side view being a mirror image thereof.

FIG. 4 shows a junction box 10 constructed in accordance with an exemplary embodiment of the present invention. The junction box 10 is shown in unassembled form and includes a housing 12, a first mounting strap 14, and a second mounting strap 16, each of which is further discussed below. It should be understood that the relative terminology used herein, such as "front", "rear", "left", "right", "top", and "bottom" is solely for the purposes of clarity and designation and is not intended to limit the invention to embodiments having a particular position and/or orientation. Accordingly, such relative terminology should not be construed to limit the scope of the present invention.

Referring to FIGS. 4–9, the housing 12 is sized and dimensioned to receive and contain various environmental structures, such as electrical wiring, electrical connectors, etc. The housing 12 includes a plurality of walls, which shall each be designated and discussed below. The housing 12 is preferably weather-proof and formed from a die-cast aluminum, such as Aluminum Alloy 380-1, where the 1-suffix refers to the percentage of zinc in the alloy.

The housing 12 includes a rear wall 18 having an inside surface, referenced herein as a rear inside surface 20, and an outside surface, referenced herein as a rear outside surface 22 The housing 12 includes a plurality of protuberances 26 that each extend from the rear outside surface 22, such that an electrician may rest the housing 12 against the building wall while maintaining a gap between the rear wall 18 and the building wall. Additionally, the protuberances 26 can function as a means for attaching mounting lugs to the junction box 10 to facilitate mounting thereof to a wall, post, or other surface.

The housing 12 further includes an annular boss 28 integrally formed in the rear wall 18. The annular boss 28 is preferably formed centrally along the rear inside surface 20. A threaded bore, referenced herein as a rear threaded bore 30, which is formed in the rear wall 18 and which passes through the annular boss 28.

The housing 12 includes a left wall 32 and a right wall 34, each one of which is a mirror image of the other. The left wall 32 and the right wall 34 are each trapezoidal and substantially planar. The housing 12 further includes a top wall 36 and a bottom wall 38, each one of which is a mirror image of the other. The top wall 36 and the bottom wall 38 are each trapezoidal and substantially planar. A cavity 40 is defined by the rear wall 18, the left wall 32, the right wall 34, the top wall 36, the bottom wall 38, and a geometric plane that extends parallel to the rear wall 18 and which is defined by the front edges of the left wall 32, the right wall 34, the top wall 36, and the bottom wall 38.

Figure 6:
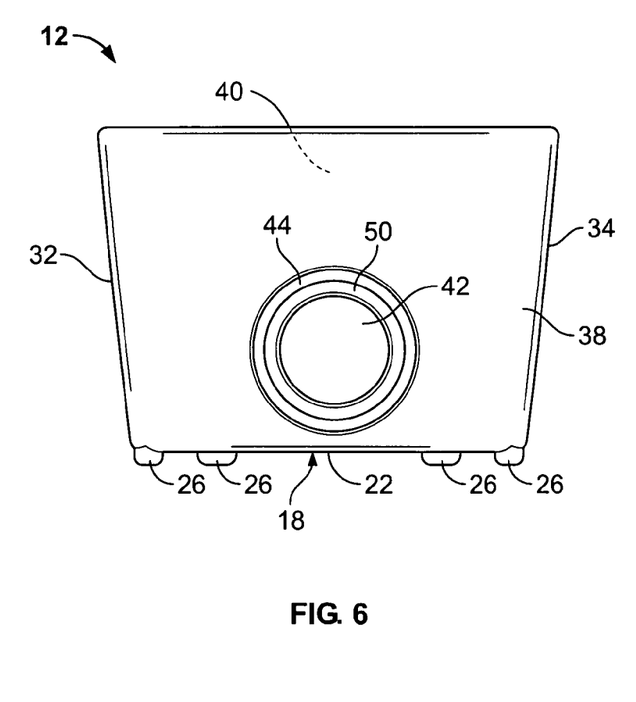
FIG. 6 is a bottom view of the housing of FIGS. 4–5, the top view being a mirror image thereof.
Figure 8:
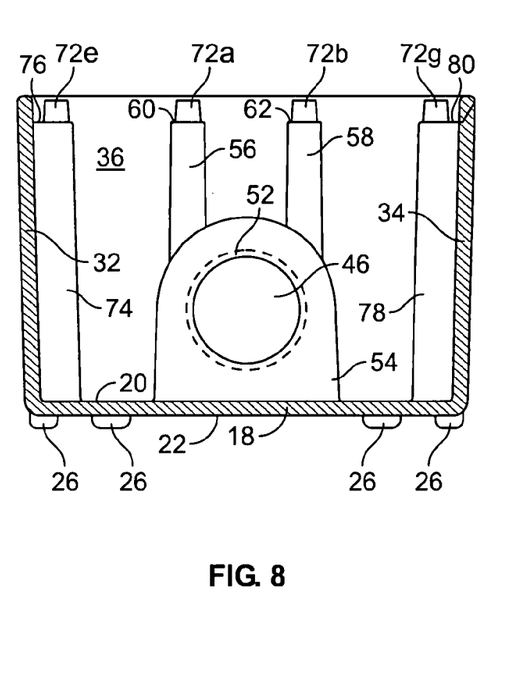
FIG. 8 is cross-sectional view of the housing of FIGS. 4–7 taken along section line 8—8 of FIG. 7.

Referring to FIG. 6, the bottom wall 38 has a threaded bore formed centrally therethrough, referenced herein as a bottom threaded bore 42, and an annular sink, referenced herein as a bottom annular sink 44, formed about the bottom threaded bore 42. Referring to FIG. 8, the top wall 36 has a threaded bore formed centrally therethrough, referenced herein as a top threaded bore 46, and an annular sink, referenced herein as a top annular sink (not shown), formed about the top threaded bore 46. Although not shown, the top annular sink is a mirror image of the bottom annular sink 44 shown in FIG. 6. The top threaded bore 46 and the bottom threaded bore 42 may each receive an electrical connection assembly or other environmental structure, and the top annular sink (not shown) and the bottom annular sink 44 may function to control the degree to which the environmental structure may be inserted through the top threaded bore 46 and the bottom threaded bore 42.

Figure 7:
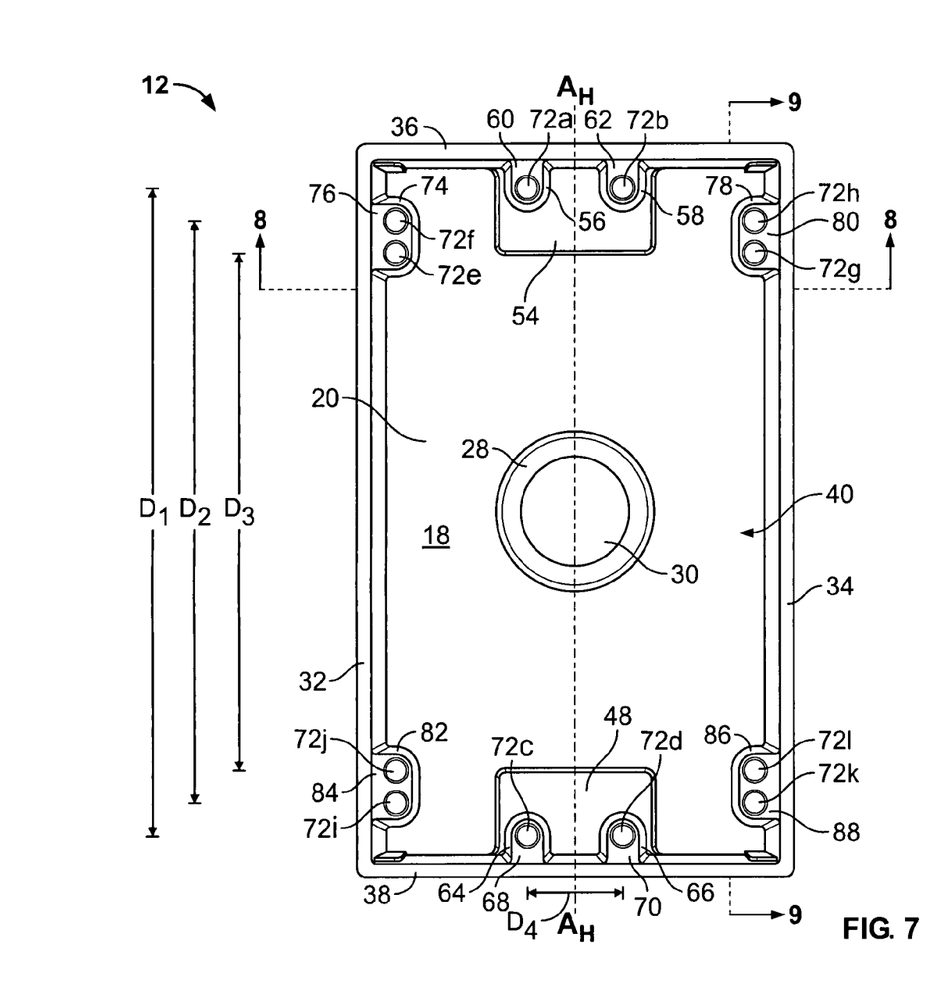
FIG. 7 is a front view of the housing of FIGS. 4–6.

Referring to FIGS. 4 and 7, the housing 12 further includes an arch-like boss, referenced herein as a bottom arch-like boss 48 that is integrally formed with the bottom wall 38 and the rear wall 18. The bottom threaded bore 42 extends through the bottom arch-like boss 48. The bottom arch-like boss 48 includes an annular lip, referenced as a bottom annular lip 50 and designated in FIG. 6, that is distal to the bottom wall 38 and that reduces the radius of the bottom threaded bore 42 at a portion thereof passing through the bottom arch-like boss 48.

Referring to FIGS. 4, 7, and 8, the housing 12 further includes another arch-like boss, referenced herein as a top arch-like boss 54, that is integrally formed with the top wall 36 and the rear wall 18. The top threaded bore 46 extends through the top arch-like boss 54. The top arch-like boss 54 includes an annular lip, referenced herein as a top annular lip 52 and designated in FIGS. 4 and 8, that is distal to the top wall 36 and reduces the radius of the top threaded bore 46 at a portion thereof passing through the top arch-like boss 54. The top annular lip 52 is a mirror image of the bottom annular lip 50 shown in FIG. 6.

Figure 9:
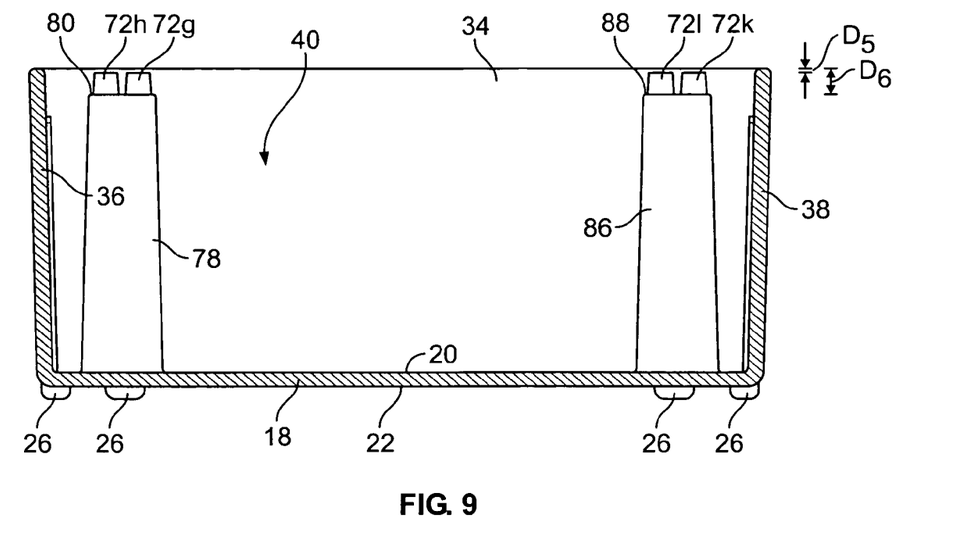
FIG. 9 is a cross-sectional view of the housing of FIGS. 4–7 taken along section line 9—9 of FIG. 7.

The housing 12 includes a plurality of ribs integrally formed therewith, which are shown in FIGS. 4 and 7–9 and designated in FIGS. 7–9. The housing 12 includes two spaced-apart ribs, referenced herein as a left top rib 56 and a right top rib 58 that are each integrally formed with the top wall 36 and the top arch-like boss 54. The left top rib 56 extends along the top wall 36 from the top arch-like boss 54 and forms a planar surface within the cavity 40 for seating the second mounting strap 16 and which is referenced herein as a left top strap seat 60. The right top rib 58 extends along the top wall 36 from the top arch-like boss 54 and forms a planar surface within the cavity 40 for seating the second mounting strap 16 and which is referenced herein as a right top strap seat 62.

The housing 12 further includes two spaced-apart ribs, referenced herein as a left bottom rib 64 and a right bottom rib 66, that are each integrally formed with the bottom wall 38 and the bottom arch-like boss 48. The left bottom rib 64 extends along the bottom wall 38 from the bottom arch-like boss 48 and forms a planar surface within the cavity 40 for seating the first mounting strap 14 and which is referenced herein as a left bottom strap seat 68. The right bottom rib 66 extends along the bottom wall 38 from the bottom arch-like boss 48 and forms a planar surface within the cavity 40 for seating the first mounting strap 14 and which is referenced herein as a right bottom strap seat 70.

The housing 12 includes a plurality of posts $72a-l$, which are herein referenced in the singular as post $72a$, post $72b$, post $72c$, post $72d$, post $72e$, post $72f$, post $72g$, post $72h$, post $72i$, post $72j$, post $72k$, or post $72l$. Each one of the strap seats 60, 62, 68, and 70 have a surface area great enough to permit at least one of the posts $72a-d$ to extend therefrom. In this regard, it is noted that post $72a$ is integrally formed with and extends from the left top strap seat 60, post $72b$ is integrally formed with and extends from the right top strap seat 62, post $72c$ is integrally formed with and extends from the left bottom strap seat 68, and post $72d$ is integrally formed with and extends from the right bottom strap seat 70. Posts $72e-l$ shall be further discussed below.

Continuing with reference to FIGS. 4 and 7–9, the housing 12 further includes "wide ribs" that each form a strap seat having a surface area great enough to permit at least two of the posts $72e-l$ to extend therefrom. The housing 12 includes a wide rib, referenced herein as a wide upper left rib 74 that is integrally formed with the left wall 32 and the rear wall 18. The wide upper left rib 74 extends along the left wall 32 from the rear wall 18 and forms a planar surface within the cavity 40 for seating the second mounting strap 16 and which is referenced herein as a wide upper left strap seat 76. Posts $72e$ and $72f$ are integrally formed with and extend from the wide upper left strap seat 76. The housing 12 further includes a wide rib, referenced herein as a wide upper right rib 78, that is integrally formed with the right wall 34 and the rear wall 18. The wide upper right rib 78 extends along the right wall 34 from the rear wall 18 and forms a planar surface within the cavity 40 for seating the second mounting strap 16 and which is referenced herein as a wide upper right strap seat 80. Posts $72g$ and $72h$ are integrally formed with and extend from the wide upper right strap seat 80.

The housing 12 includes a wide rib, referenced herein as a wide lower left rib 82 that is integrally formed with the left wall 32 and the rear wall 18. The wide lower left rib 82 extends along the left wall 32 from the rear wall 18 and forms a planar surface within the cavity 40 for seating the first mounting strap 14 and which is referenced herein as a wide lower left strap seat 84. Posts 72*i* and 72*j* are integrally formed with and extend from the wide lower left strap seat 84. The housing 12 further includes a wide rib, referenced herein as a wide lower right rib 86, that is integrally formed with the right wall 34 and the rear wall 18. The wide lower right rib 86 extends along the right wall 34 from the rear wall 18 and forms a planar surface within the cavity 40 for seating the first mounting strap 14 and which is referenced herein as a wide lower right strap seat 88. Posts 72*k* and 72*l* are integrally formed with and extend from the wide lower right strap seat 88.

Although the invention is not limited to embodiments having specific dimensions, it is noted that the housing 12 can be dimensioned in accordance with an exemplary set thereof. For example, the distance from the center of post 72*a* to the center of post 72*c*, referenced herein as distance $D_1$, is preferably about 4.000 inches, the distance from the center of post 72*f* to the center of post 72*i*, referenced herein as distance $D_2$, is preferably about 3.590 inches, and the distance from the center of post 72*e* to the center of post 72*j*, referenced herein as distance $D_3$, is preferably about 3.190 inches.

Continuing with a description of the exemplary set of dimensions, it is noted that the housing 12 is at least partially symmetrical about a longitudinal axis of the housing 12, which is referenced herein as axis $A_H$. Due to the symmetry of the housing 12 about axis $A_H$, the distance between post 72*b* and post 72*d* is substantially equal to distance $D_1$, the distance between post 72*h* and post 72*k* is substantially equal to distance $D_2$, and the distance between post 72*g* and post 72*l* is substantially equal to distance $D_3$. Each one of posts 72*e–l* is preferably offset from the axis $A_H$ of the housing 12 by 1.125 inches. The distance between post 72*c* and post 72*d*, referenced herein as distance $D_4$, is substantially equal to the distance between post 72*a* and post 72*b* and is preferably equal to about 0.60000 inches, such that each of posts 72*a*, 72*b*, 72*c*, and 72*d* are offset from the axis $A_H$ by 0.30000 inches. Again, as stated above, the present invention is not limited to having the exemplary set of dimensions herein discussed, but may have any suitable dimensions appreciated by one skilled the art.

Referring to FIG. 9, each one of the posts 72*a–l* terminates within the cavity 40. FIG. 9 does not show posts 72*a–f* and 72*i–j* and the strap seats 60, 62, 68, 70, 76, and 84 corresponding therewith. However, exemplary reference shall be made to the posts 72*h–g* and 72*l–k* and the strap seats 80, 88 of FIG. 9. The front surfaces of each one of the posts 72*a–l*, including the posts 72*h*, 72*g*, 72*l*, and 72*k* shown in FIG. 9, are preferably offset from the front geometric plane of the housing 12 by a distance $D_5$ that is preferably equal to about 0.023 inches. Each one of the strap seats 60, 62, 68, 70, 76, 80, 84, and 88, including the strap seats 80, 88 shown in FIG. 9, are offset from the first geometric plane by a distance $D_6$ that is preferably equal to about 0.158 inches. However, as stated above, the present invention is not limited to having the exemplary dimensions discussed herein, but may have any suitable dimensions appreciated by one skilled the art.

Figure 10:
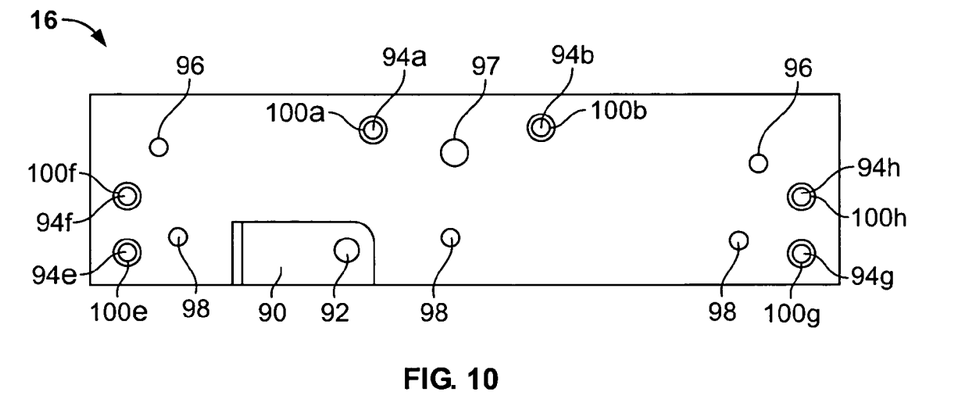
FIG. 10 is a front view of the second mounting strap of FIG. 4.
Figure 11:
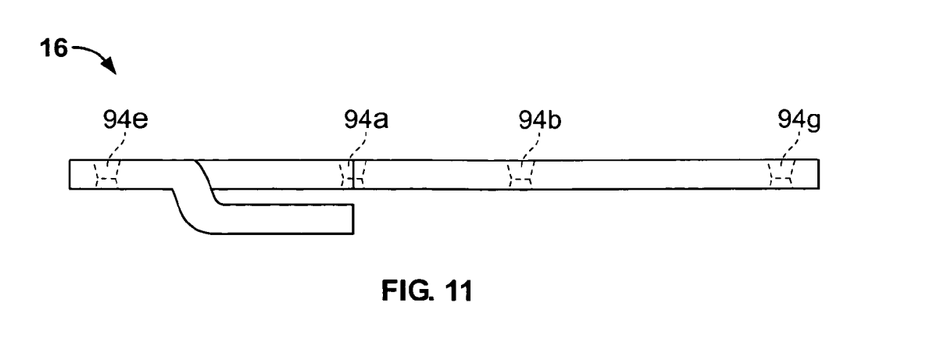
FIG. 11 is a bottom view of the mounting strap of FIGS. 4 and 10.

Referring to FIGS. 4 and 10–11, the junction box 10 preferably includes the first mounting strap 14 and the second mounting strap 16 referenced above, which shall each now be discussed. The first mounting strap 14 is formed in a planar, rectangular shape and is sized and dimensioned to fit within the cavity 40 when abutting the left bottom strap seat 68, the right bottom strap seat 70, the wide lower left strap seat 84, and the wide lower right strap seat 88. The second mounting strap 16 is preferably formed in a planar, rectangular shape and is sized and dimensioned to fit within the cavity 40 when abutting the left top strap seat 60, the right top trap seat 62, the wide upper left strap seat 76, and the wide upper right strap seat 80. The mounting straps 14, 16 are preferably formed from Aluminum 5052-H34, where the H34 indicates the hardness. The thickness of each one of the mounting straps 14, 16 is preferably about eighty thousandths of an inch (0.080").

The first mounting strap 14 and the second mounting strap 16 are preferably identical to one another in substantially all respects, except that the second mounting strap 16 includes a stepped area 90 having an opening 92 formed therethrough for receiving a ground screw. In this regard, discussion is made below with exemplary reference to the second mounting strap 16; however, said discussion applies to both the first mounting strap 14 and the second mounting strap 16.

Referring to FIGS. 4 and 10–11, the second mounting strap 16 has a plurality of receiving areas 94*a*, 94*b*, 94*e*, 94*f*, 94*g*, and 94*h* formed therethrough, each one being sized, dimensioned, and aligned to receive a corresponding one of the posts 72*a*, 72*b*, 72*e*, 72*f*, 72*g*, and 72*h*. As shown in FIG. 4, the first mounting strap 14 has a plurality of receiving areas 94*c*, 94*d*, 94*i*, 94*j*, 94*k*, and 94*l* formed therethough that are sized, dimensioned, and aligned for receiving a corresponding one of the posts 72*c*, 72*d*, 72*i*, 72*j*, 72*k*, and 72*l*. The first mounting strap 14 and the second mounting strap 16 further include threaded apertures 96, an untapped clearance opening 97, and threaded apertures 98 that may receive fasteners, such as mounting screws (not shown). The threaded apertures 96 can be used for the attachment of box extensions, while the threaded apertures 98 can be used for the attachment of devices.

Each one of the receiving areas 94*a–l* are defined by a contiguous radial surface, such as each of the exemplary contiguous radial surfaces 100*a*, 100*b*, 100*e*, 100*f*, 100*g*, and 100*h* shown and designated in FIG. 10 in connection with receiving areas 94*a*, 94*b*, 94*e*, 94*f*, 94*g*, and 94*h*. However, it shall be clear to one skilled in the art that each one of the receiving areas 94*a–l* may be defined by a contiguous radial surface corresponding thereto.

Figure 12:
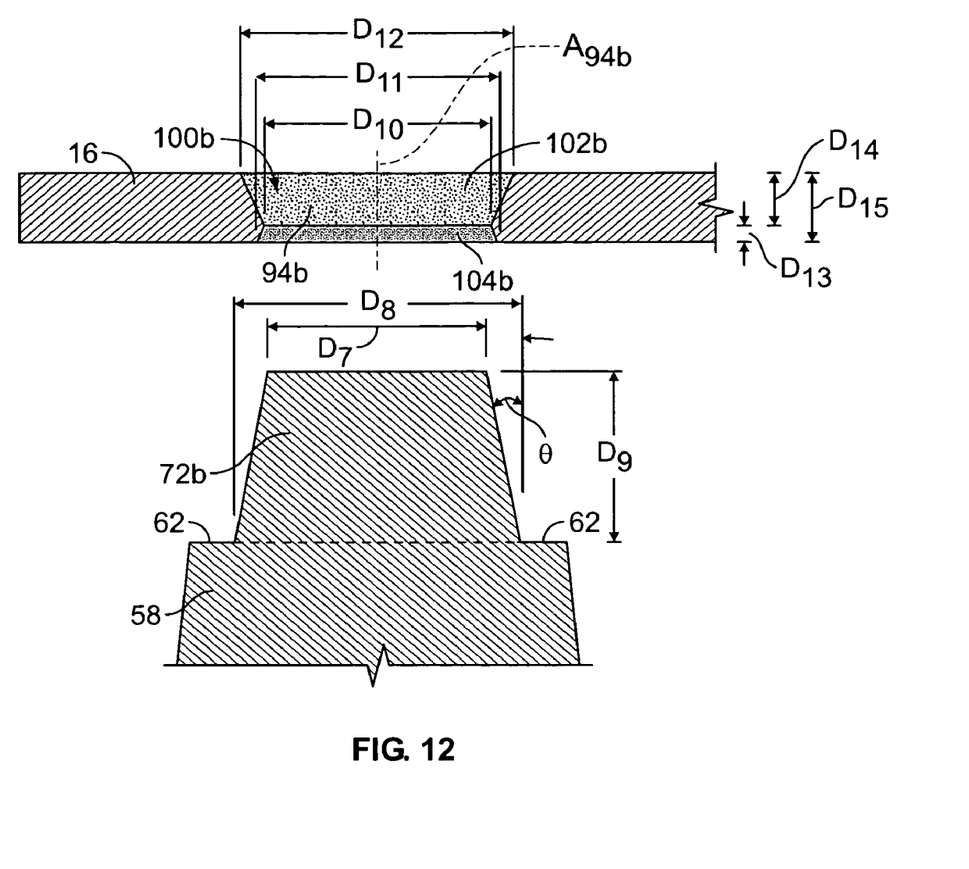
FIG. 12 is a broken cross-sectional view taken along section line 12—12 of FIG. 4 showing a post and a receiving area corresponding therewith in an unassembled form.
Figure 13:
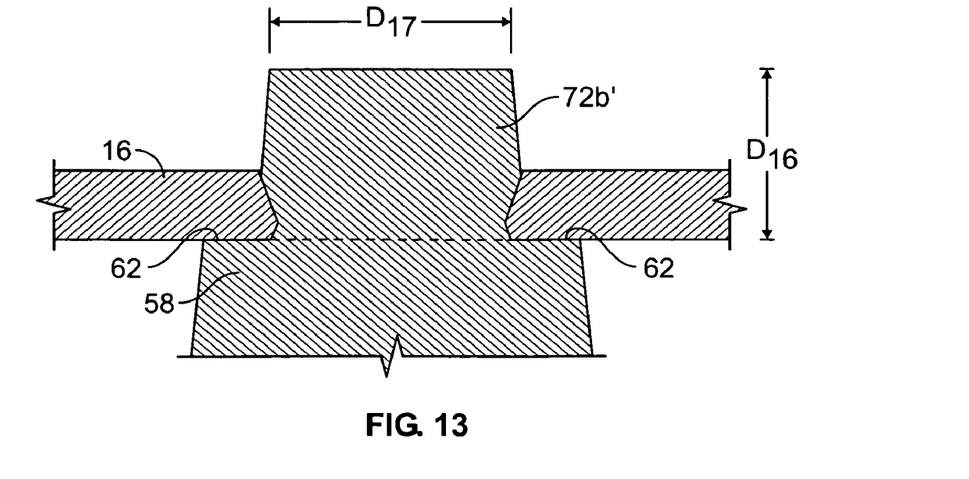
FIG. 13 is the broken cross-sectional view of FIG. 12 with the post and the receiving area thereof being shown in an assembled form.

Referring to FIGS. 12 and 13 and with exemplary reference to post 72*b*, receiving area 94*b*, and contiguous radial surface 100*b*, the structure of each of the posts 72*a–l*, the receiving areas 94*a–l*, and the contiguous radial surfaces corresponding thereto shall be further discussed. Particular attention will be given to the method of assembling the junction box 10, the structure of the posts 72*a–l* prior to said assembly, and the structure of the posts 72*a–l* subsequent to said assembly. For the purpose of clarity, the exemplary post, in its form prior to assembly, is designated in FIG. 12 as post 72*b*, while the same exemplary post, in its form subsequent to assembly, is designated in FIG. 13 as post 72*b'*.

Referring to FIG. 12, the post 72*b* is substantially frustoconical prior to assembly. For example, the post 72*b* includes a front end diameter $D_7$, a rear end diameter $D_8$ that is greater than the front end diameter $D_7$, and a frustoconical surface that angles with respect to the normal angle. Prior to assembly, the front end diameter $D_7$ is preferably about 0.1500 inches and the rear end diameter $D_8$ is preferably about 0.1600 inches. The frustoconcial surface is inclined at an angle θ with respect to normal, and the angle θ is preferably between about one (1) degree and about three (3)

degrees and is more preferably about equal to two (2) degrees. The preferred height $D_9$ of the post 72b, prior to assembly, is about 0.135 inches. The present invention is not limited to embodiments having these exemplary dimensions and each one of the posts 72a–l may have any suitable dimensions appreciated by one skilled the art.

Continuing with reference to FIG. 12, the mounting strap 16 preferably includes the contiguous radial surface 100b formed therein to define the receiving area 94b. Unlike the open channels of the prior art shown in FIG. 1, the contiguous radial surface 100b circumscribes substantially the entire receiving area 94b. In exemplary embodiments of the invention, the contiguous radial surface 100b is symmetrical about a central axis, which is referenced herein as a countersink axis $A_{94b}$. In the exemplary embodiment of the invention shown in FIG. 12, the contiguous radial surface 100b is inclined with respect to the front and rear surfaces of the second mounting strap 16, such that the contiguous radial surface 100b extends from a front surface of the second mounting strap 16 toward the countersink axis $A_{94b}$, and then away from the countersink axis $A_{94b}$ toward a rear surface of the second mounting strap 16. This delineates two adjacent surfaces, and the contiguous radial surface 100b may be characterized as including a countersink surface 102b and an inverted countersink surface 104b that is adjacent thereto and shares a common radial edge therewith. It is noted that FIG. 12 shows the countersink surface 102b and the inverted countersink surface 104b to have stippling and shading, respectively, however such stippling and shading is not used to represent the type of material forming surfaces 102b, 104b, but is used to show the curvature of said surfaces 102b, 104b.

Although the invention is not limited to embodiments having specific dimensions, it is noted that the receiving area 94b can be dimensioned in accordance with an exemplary embodiment of the invention. In the exemplary embodiment, the common radial edge has a diameter $D_{10}$ of about 0.1580 inches. Moreover, the wide end of the inverted countersink surface 104b has a diameter $D_{11}$ of about 0.1660 inches, such that the inverted countersink surface 104b tapers in a direction away from the rear wall 18 of the housing 12. The wide end of the countersink surface 102b has a diameter $D_{12}$ of about 0.1900 inches, such that the countersink surface 102b tapers in a direction toward the rear wall 18 of the housing. The thickness $D_{13}$ of the inverted countersink surface 104b is preferably about 0.0350 inches, the thickness $D_{14}$ of the countersink surface 102b is preferably about 0.0450 inches, and the thickness $D_{15}$ of the second mounting strap 16 is preferably about 0.0800 inches.

The first mounting strap 14 may be assembled with the housing 12 by abutting the first mounting strap 14 against seats 68, 70, 84, and 88 such that each one of the posts 72c–d and 72i–l are each inserted through one of the receiving areas 94c–d and 94i–l corresponding thereto. The second mounting strap 16 may be assembled with the housing 12 to form the junction box 10 by abutting the second mounting strap 16 against seats 60, 62, 76, and 80 such that each one of the posts 72a–b and 72e–h are inserted through one of the receiving areas 94a–b and 94e–h corresponding thereto. After the posts 72a–l have been inserted in their respective receiving areas 94a–l, each one of the posts 72a–l is hammered with a power press.

The mounting straps 14, 16 are preferably formed and staked onto the housing 12 using a twenty-two ton Open Back Inclinable (OBI) flywheel-type mechanical power press manufactured by the Minister Machine Company of Minister, Ohio. The press preferably has a three-inch stroke and a two-inch slide adjustment. The press is preferably set to stake the posts 72a–k and reduce the height thereof by thirty-five thousandths of an inch (0.035"). In preferred embodiments of the invention, the power press is set to reduce the height of each of the posts 72a–l from 0.135 inches to 0.100 inches.

Referring to FIG. 13, the hammering force of the power press causes deformation of the posts 72a–l, which are preferably aluminum. The exemplary post 72b of FIG. 12 is shown in FIG. 13 in exemplary assembled form and is designated as post 72b'. In the exemplary embodiment of the invention, the hammering force decreases the height $D_9$ from about 0.135 inches to a height $D_{16}$ of about 0.100 inches, while increasing the front end diameter $D_7$ of 0.150 inches to a front end diameter $D_{17}$ of 0.1700 inches. In some embodiments of the invention, the post 72b' may be characterized as a deformed frustrum. The post 72b' securingly retains the second mounting strap 16 against the housing 12. Conversely, the post 72b' is shown to be securingly bottlenecked by any one or more of the countersink surface 102b, the inverted countersink surface 104b, the shared radial edge thereof, and/or the right top strap seat 62.

In preferred embodiments of the invention, the junction box 10 in assembled form can withstand a torque test of at least twelve inches per pound. Moreover, the junction box 10 constructed in accordance with the exemplary embodiment of the invention can support at least a twenty pound hanging weight for at least about one minute. More particularly, preferred embodiments of the present invention are compliant with Sections 12.3.1–12.3.3 of the Underwriters Laboratories (UL) Standards, NMX-J-023/1-ANCE, CSA C22.2 No. 18.1-04, UL 514A, pages 44, 67 Table 8, and 75 FIG. 12 (Feb. 16, 2004).

The junction box 10 is preferably formed from aluminum and is weatherproof. In some embodiments of the invention, the junction box may be characterized as a multi-gang junction box, such that it is wider and includes multiple sets of arch-like bosses 48, 54 and threaded bores 42, 46, as well as additional ribs, strap seats, mounting straps, receiving areas, and posts.

It will be understood that the exemplary embodiment of the present invention described herein is merely exemplary and that a person skilled in the art may make many variations and modifications without departing from the spirit and scope of the invention. All such variations and modifications, including those discussed above, are intended to be included within the scope of the invention as defined in the appended claims.

What is claimed is:

1. A junction box in assembled form, comprising a mounting strap having a countersink surface at least partially defining a receiving area which extends through said strap; and a housing having a front side, which is substantially open, and a rear side, which is substantially closed, said housing having a post which is formed integrally with said housing as a deformed frustrum and which projects away from said housing from said rear side of said housing, said post extending through said receiving area of said strap and engaging said countersink surface, said countersink surface being tapered in a direction toward said rear side of said housing so as to securingly bottleneck said strap against said housing.

2. The junction box of claim 1, further including a second mounting strap, a second receiving area and a second countersink surface.

3. The junction box of claim 1 wherein said housing includes a surfaces extending parallel to said mounting straps to seat said mounting straps.

4. The junction box of claim 3, further including a second post, wherein said post and said second post extend from said surface extending parallel to said mounting strap.

5. The junction box of claim 1, wherein said mounting strap includes an inverted countersink surface cooperating with said countersink surface to at least partially define said receiving area.

6. The junction box of claim 5, wherein said countersink surface and said inverted countersink surface have a common radial edge.

7. The junction box of claim 6, wherein said post is securingly bottlenecked by said common radial edge.

8. The junction box of claim 1, wherein said countersink surface is contiguous.

9. The junction box of claim 1, wherein at least a portion of said housing is formed from Aluminum Alloy 380-1.

10. The junction box of claim 1, wherein at least a portion of said mounting strap is formed from Aluminum 5052-H34.

11. The junction box of claim 1, wherein said post is a deformed frustrum.

12. The junction box of claim 1, wherein said countersink surface has first and second ends, said countersink surface extending from said first end toward said rear side of said housing and terminating at said second end, said countersink surface being tapered in said direction such that said first end has a size greater than that of said second end.

13. The junction box of claim 12, wherein said second end of said countersink surface forms a bottleneck engaging said post.

14. The junction box of claim 1, wherein said rear side of said housing has a threaded bored formed therethrough.

15. A method of manufacturing a junction box, comprising:
   providing a housing having a post formed integrally therewith in substantially frustoconical form, said housing having a front side, which is substantially open, and a rear side, which is substantially closed,
   providing a mounting strap having a countersink surface formed therein to at least partially define a receiving area said countersink surface being tapered;
   inserting said post through said receiving area such that the tapering of said countersink surface extends in a direction toward said rear side of said housing; and
   deforming said post to form a deformed frustrum such that said post securingly bottlenecking said mounting strap against said housing.

* * * * *